United States Patent [19]
Fetzer et al.

[11] Patent Number: 5,080,457
[45] Date of Patent: Jan. 14, 1992

[54] APPARATUS FOR GENERATING A LIGHT CURTAIN

[75] Inventors: Günter Fetzer, Gundelfingen; Zeljko Jaksic, Waldkirch, both of Fed. Rep. of Germany

[73] Assignee: Erwin Sick GmbH Optik-Elektronik, Waldkirch, Fed. Rep. of Germany

[21] Appl. No.: 550,422

[22] Filed: Jul. 10, 1990

[30] Foreign Application Priority Data

Jul. 18, 1989 [DE] Fed. Rep. of Germany ....... 3923788

[51] Int. Cl.$^5$ ............................................. G02B 26/10
[52] U.S. Cl. ..................................... 359/208; 359/217; 250/235
[58] Field of Search ............ 350/6.5, 6.7, 6.8; 346/107 R, 108; 250/236, 555, 235; 358/296; 356/386

[56] References Cited

U.S. PATENT DOCUMENTS

| | | | |
|---|---|---|---|
| 4,116,527 | 9/1978 | Sick | 356/216 |
| 4,196,961 | 4/1980 | Walter et al. | 359/217 |
| 4,230,394 | 10/1980 | Brueggemann et al. | 359/217 |
| 4,848,864 | 7/1989 | Ostertag et al. | 359/216 |

Primary Examiner—Loha Ben
Attorney, Agent, or Firm—Townsend and Townsend

[57] ABSTRACT

An apparatus is described for generating a light curtain which includes an originally spherical strip-like concave mirror 10 and a light deflecting element 12 arranged in the vicinity of the focal point of the concave mirror. The light deflecting element 12 guides a bundled light beam periodically over the concave mirror 10. The strip-like concave mirror 10 is twisted within itself in such a way that each surface portion of the concave mirror 10 which is illuminated during a complete sweep of the light beam extends at at least substantially the same angle to the beam axis in a plane perpendicular to the scanning direction.

8 Claims, 2 Drawing Sheets

APPARATUS FOR GENERATING A LIGHT CURTAIN

BACKGROUND OF THE INVENTION

The invention relates to an apparatus for generating a light curtain comprising an image forming strip-like concave mirror and a light deflecting means arranged in the vicinity of the focal point of the concave mirror which periodically sweeps a bundled light beam coming from a radiation source over the concave mirror which extends in the scanning direction and/or receives a received light beam from the concave mirror and directs it to a photoelectric converter, wherein the radiation source or photoelectric converter and the light deflecting means on the one hand, and also the concave mirror and the beam exit or entry on the other hand, lie in different planes.

In apparatus of this kind an interruption of the scanning beam through a shadow effect caused by the deflecting unit is avoided by the fact that the beam source or photoelectric converter and the light deflecting means on the one hand, and the concave mirror and the beam outlet or inlet on the other hand, lie in two different planes. With an arrangement of this kind one can accordingly use not only the half aperture but rather the full aperture of the system. This arrangement in two different planes has however the consequence that the scanning beam no longer moves along a straight line on the image forming strip-like concave mirror but rather along a circular path. A circular path of this kind arises as result of the Z-angle shaped path of the beam and the fact that the point of origin of the light deflecting unit is not arranged at the center of curvature of the concave mirror, but rather in the vicinity of the focal point. As a consequence of the path of the beam along the circular track the beam is reflected at different angles in a plane perpendicular to the general scanning direction. Since an angular error is thus present the amount of the deviation becomes larger as the distance from the concave mirror increases.

In an apparatus of the initially named kind, as known from DE AS 26 22 113, this straight running error was admittedly partly compensated by a plane parallel plate. This correction plate however is a relatively large, precise and thus expensive component.

An optical scanning device is known from DE 35 14 302 A1 in which one of the image forming elements is formed as a spherical strip-like concave mirror.

Furthermore, a scanning device with a straight line light deflection is already known from DE OS 21 31 467 and has a mirror surface as a scanning element, with the mirror surface being helically wound and rotatable about the axis of the helix.

SUMMARY OF THE INVENTION

The object of the present invention is to provide an apparatus for generating a light curtain of the initially named kind, comprising an image forming strip-like concave mirror and a light deflecting means arranged in the vicinity of the focal point of the concave mirror, in which the straight running error is practically completely alleviated.

This object is satisfied in accordance with the invention in that the originally spherical, strip-like concave mirror is twisted in accordance with a defined function relative to an axis which extends substantially in the direction of the strip, in such a way that each surface portion of the concave mirror which is illuminated by the light beam or by the received beam during a complete sweep stands at least substantially at the same angle to the beam axis in a plane perpendicular to the scanning direction.

The invention is accordingly in particular based on the concept of using a concave mirror strip having a surface shape of which intentionally deviates from the spherical surface in order to compensate for the described straight running error.

This is possible, in the simplest manner and without any notably increasing complexity in manufacture, by twisting the concave mirror strip in accordance with the invention.

Each longitudinally extending half of the concave mirror is preferably respectively twisted along a helical line. If the part circular path which produces the straight running error has e.g. a deflection maximum at the center of the concave mirror strip, and the same deflection minima at the two ends, then the helical lines which determine the twisting of the two mirror halves extend in the opposite senses.

In an apparatus with a light deflecting means as the mirror wheel provision is made, in accordance with a preferred embodiment, for the rotation of the originally spherical strip-like concave mirror to be directed with respect to the size and position of the mirror wheel in such a way that the straight running error which occurs is largely compensated. In so doing account is taken of the fact that the position (tilting), size and shape of the mirror wheel determine the resulting differences of the distances of the points of light incidence on the mirror wheel relative to the radiation source and to the concave mirror, and thus influence the circular track which is responsible for the straight running error.

BRIEF DESCRIPTION OF THE DRAWINGS

The invention will now be described in more detail in the following with reference to the embodiment and to the drawing in which are shown.

DETAILED DESCRIPTION OF THE PREFERRED EMBODIMENT

Figure 1:
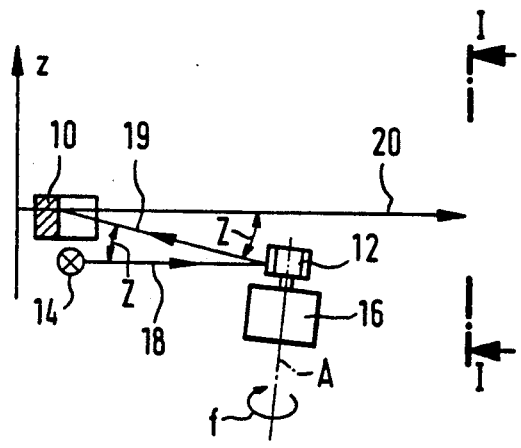
FIG. 1 a partly sectioned schematic representation of the apparatus of the invention for generating a light curtain, with the section being taken perpendicular to the scanning plane, FIG. 2 a schematic view of the subject of FIG. 1 in accordance with the line I—I, FIG. 3 a schematic plan view of the strip-like concave mirror shown in FIG. 2, with only one of the two halves of the concave mirror being shown, FIG. 4 a schematic side view of the strip-like concave mirror shown in FIG. 2 to an enlarged scale, with the path of the beam being shown for two mirror wheel positions, and FIG. 5 a view comparable to FIG. 4 in which two surface elements of the concave mirror are shown which are tilted relative to one another to compensate for the straight running error.
Figure 2:
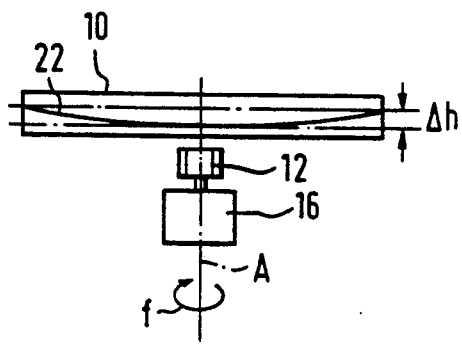

In accordance with FIGS. 1 and 2 a radiation source 14 generates, with the aid of optical means which are not shown here, a bundled light beam 18, which is directed onto the surface of a mirror wheel 12 serving as a light deflecting means and which rotates at constant speed of rotation in the direction of the arrow f. The mirror wheel 12 is driven by means of a motor 16.

The light reflecting surface of the mirror wheel 12 is located in the vicinity of the focal point of a strip-like concave mirror 10 which, in accordance with the invention is curved in a manner which deviates from a sphere. The longitudinal direction of the strip-like concave mirror 10 lies perpendicular to the axis of rotation A of the rotary mirror 12 and parallel to the general scanning direction. The axis of rotation of the mirror wheel 12 is tilted relative to a straight line perpendicular to the scanning plane.

The mirror wheel sweeps the bundled light beam 18 coming from the radiation source 14 periodically over the concave mirror 10 which extends generally in the scanning direction. During this the concave mirror 10 reflects the light beams 19 coming from the mirror wheel 12 and generates an emergent beam, i.e. the scanning beam 20, which is for example directed onto a retro-reflector which can be formed as a triple mirror. In this case the light will be reflected back on itself and directed via the concave mirror 10, the mirror wheel 12 and a beam divider (not shown) to a photoelectric receiver (not shown).

In the light curtain which arises the scanning of articles which are located there takes place in accordance with the scanning beam principle, i.e. a scanning beam which is preferably generated by a laser is directed in the ideal case parallel to itself over the light curtain. A light curtain of this kind extends perpendicular to the plane of the drawing of FIG. 1.

In accordance with FIG. 1 the radiation source 14 and the mirror wheel 12 on the one hand and also the image forming strip-like concave mirror 10 and the light exit or scanning beam 20 lie in two different planes. This is intended to avoid an interruption of the scanning beam due to a shadow effect caused by the mirror wheel. With an arrangement of this kind one can accordingly exploit not only the half-aperture but rather the full aperture of the system. With this arrangement one obtains a Z-angled beam path for beams 18, 19 and 20 in a plane perpendicular to the general scanning plane.

As a result of this beam path which forms a Z-angle, and of the fact that the origin of the mirror wheel 12 is not at the center of curvature of the concave mirror, but rather in the vicinity of the focal point, the scanning beam no longer moves on a straight line along the spherical strip-like concave mirror 10, which would be the ideal case, but rather along a circular track 22 (see FIG. 2).

As a result of this path of the scanning beam on a circular track the scanning beam 20 reflected from the concave mirror 10 is reflected at different angles relative to the axis z (see FIG. 1) perpendicular to the general scanning plane. As this is an angular error the amount of the deviation becomes greater with increasing distance from the concave mirror 10. This can for example be seen from the representation of the FIG. 4.

There a side view, comparable to FIG. 1 of the spherical strip-like concave mirror 10 is shown to an enlarged scale. Two beam paths 18, 19, 20 and 18', 19', 20' are shown for two different positions of the mirror wheel. For the two mirror wheel positions the position at which the light beam 18 or 18' coming from the beam source impinges on the mirror wheel and is reflected as the light beam 19, 19' to the strip-like concave mirror 10 is designated with M and M' respectively.

The mirror wheel directs the reflected light beam 19 at the point of incidence M, which lies closer to the concave mirror than the point of incidence M', to a position in the left or right hand edge region of the strip-like concave mirror. In these edge regions of the strip-like concave mirror the deviation in the upward direction of the light beam or scanning beam brought about by the circular track 22 amounts to a maximum (see also FIG. 2).

Figure 4:
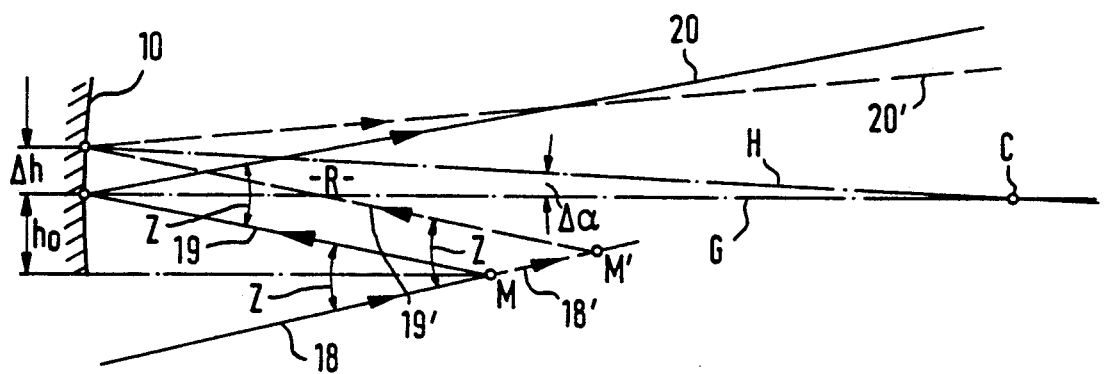

In FIG. 4 the vertical distance between the point of incidence M of the light and the position at which the light beam 19 impinges on the concave mirror 10 is designated with $h_0$. A straight line G which extends through the point of incidence on the concave mirror 10 and also through the center of curvature C of the concave mirror forms the angular bisector between the light beam 19 incident onto the concave mirror 10 and at the scanning beam 20 reflected by the concave mirror. This results in the so-called Z-angle beam path in which the angle between the light beam 18 coming from the radiation source and the light beam 19 directed towards the concave mirror 10 is substantially the same as the angle between the light beam 19 and also the scanning beam 20 reflected from the concave mirror 10.

When the point of light incidence M' results after a corresponding rotation of the mirror wheel then the beam path 18', 19', 20' arises which leads to a point of incidence on the concave mirror 10 of the light beam 19' directed towards the concave mirror which has a vertical distance $\Delta h$ from the first point of light incidence on this concave mirror (see also FIG. 2). This value $\Delta h$ is in the present case the maximum value of the deviation of the scanning beam guidance from a straight line.

As can be seen from FIG. 4 the light beams 19, 19' which are directed to the spherical strip-like concave mirror 10 extend in the two mirror wheel positions approximately parallel to one another. As a result of the straight running error which occurs this does not however any longer apply to the two scanning beams 20, 20'. The angle between the two beams 20', 19' is namely smaller than the angle between the comparable beams 19 and 20. It is the spherical curvature of the strip-like concave mirror 10 which is responsible for this.

The angular bisector between the beams 19' and 20' is defined in turn by a straight line H which extends through the center of curvature C of the concave mirror 10 and the point of incidence of the beam on the concave mirror 10. The angular error which can clearly be seen in FIG. 4 leads to the fault deviation becoming larger with increasing distance from the concave mirror 10.

In order to ensure that a straight sweep of the scanning beam 20 is ensured even at larger distances from the concave mirror 10 the original spherical strip-like concave mirror 10 is twisted in accordance with the invention relative to an axis S (see FIG. 3) extending substantially in the longitudinal direction of the strip in such a way that each surface portion of the concave mirror 10 which is illuminated during a complete scan by the light beam 19 or 19' stands at least substantially at the same angle $\beta$, $\beta'$ (see FIG. 5) to the light beam 19 or 19' in a plane (in FIG. 4 the plane of the drawing) which is perpendicular to the general scanning direction or scanning plane.

Figure 5:
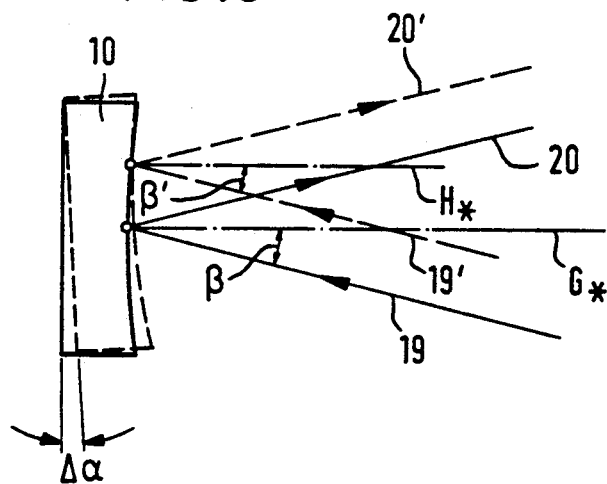

As can be seen from FIG. 5 the two surface portions of the strip-like concave mirror 10 on which the beams 19, 19' impinge by way of example (see also FIG. 2) are tilted relative to each other through the angle $\Delta\alpha$ in such a way that they stand at the same angle to the axis of the beam 19 or 19'. The straight lines G∗ and H∗ in turn form the angular bisectors for the beam pairs 19, 20 and 19', 20'. The two straight lines hereby each pass through the center of curvature of the two surface elements of the concave mirror 10 which are turned relative to each other. These straight lines simultaneously form the normals to the surface portions and determine the angles $\beta$ and $\beta'$ at which the surface portions of the concave mirror 10 stand relative to the axis of the respectively instant beam 19 and 19'. In the present case these two angles are at least substantially of the same size. The angle $\Delta\alpha$ through which the two surface portions of the strip-like concave mirror 10 shown in FIG. 5 are twisted relative to each other is the same as the angle $\Delta\alpha$ between the two straight lines G and H which extend through the center of curvature and the two points of incidence on the concave mirror when the concave mirror has not yet been twisted (see FIG. 4). FIG. 5 shows clearly that the two scanning beams 20, 20' with the strip-like concave mirror 10 twisted in accordance with, the invention extend at least substantially parallel to each other so that a practically straight line path for the scanning beam is obtained even at larger distances from the concave mirror 10. The twisting of the concave mirror is however also basically conceivable in such a way that the two scanning beams 20, 20' intersect on a scanning line, for example on a material web or the like.

Thus, in accordance with the invention a concave strip-like mirror of this kind having a surface shape which differs intentionally from the spherical surface is used in order to compensate for the described straight running error.

Since in the example shown in FIG. 2 the sweeping error in accordance with the circular track 22 on the strip-like concave mirror 10 reduces symmetrically towards both side edges the two concave mirror halves are mutually twisted in themselves in opposite senses and indeed in each case in accordance with a helical line.

For this purpose a torsional angle $\Delta\alpha$ can be determined for each height $H_i$ measured in the longitudinal direction of the strip, or in the scanning direction of the strip-like originally spherical concave mirror 10, such that the relevant surface portions always stand at the same angle to the beam axis and thus that reflective scanning beam 20 or 20' is reflected at the same angle independently of the height $H_i$.

Figure 3:
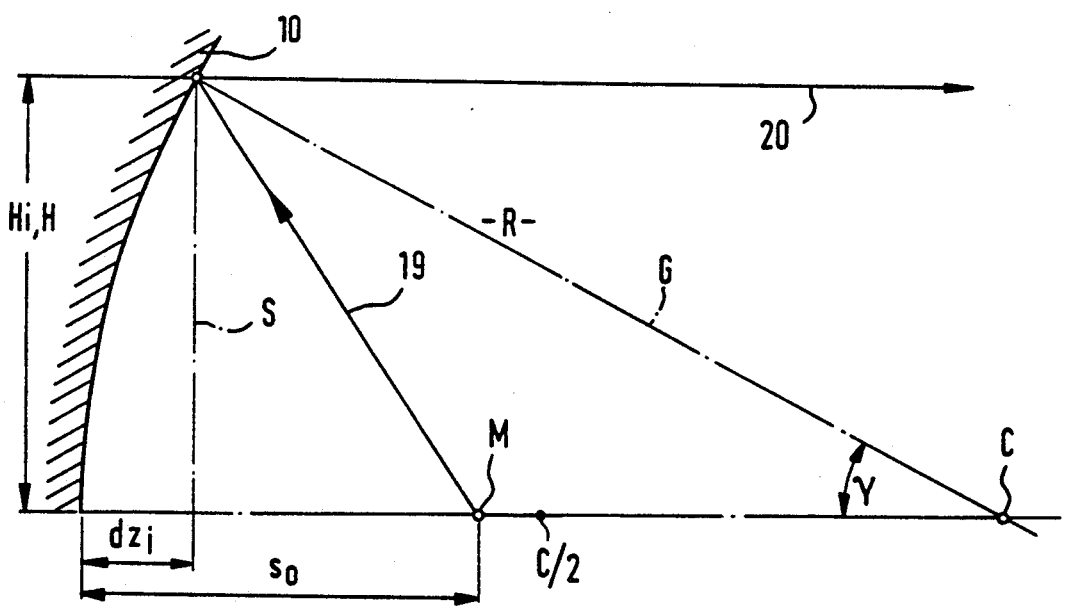

For the derivation of the named relationship between the torsional angle $\Delta\alpha$ and the concave mirror height $H_i$, FIG. 3 shows a schematic plan view of the on half of the strip-like concave mirror 10 shown in FIGS. 1 and 2. Here the mirror wheel adopts a position such that the light beam 19 from the point of incidence M is directed towards the upper edge of the strip-like concave mirror 10 in FIG. 3 in order to generate the scanning beam 20. The angular bisector between these two beams 19 and 20 is in turn formed by the straight line G which extends through the center of curvature C of the concave mirror 10 and the point of incidence on the concave mirror. The distance between the center of curvature C and the point of incidence on the concave mirror 10 is the same as the radius of curvature R of the concave mirror 10.

As can be directly seen from FIG. 3 the half mirror aperture is determined by the angle $\gamma$ or the height H. The distance between the apex point of the spherical strip-like concave mirror 10 and the point of incidence M on the mirror wheel is the same as the distance $s_0$.

The arrow height of the mirror strip is designated with $dz_i$ and is the same as the distance between the apex point and the point of intersection between the straight line S extending in the longitudinal direction of the strip and a straight line extending through the center of curvature C and the apex point as well as the point of incidence M.

The torsional angle $\Delta\alpha$ which determines the twisting of the concave mirror 10 which is to be effected about the axis S is the same as the angle which, in accordance with FIG. 4, is enclosed with a not yet twisted concave mirror strip between the straight lines G and H.

The torsional angle $\Delta\alpha$ which compensates for the straight running error for the particular height $H_i$ of the spherical strip-like concave mirror 10 now results from the following relationship:

$$\Delta\alpha = \arcsin((\sqrt{H_i^2+(s_0-dz_i)^2}\times \cos z/2) \times \sin z/2) - h_0)/R$$

(see FIGS. 3, 4)

with: $0 \leq H_i \leq H$, where H=half mirror aperture (see FIG. 3)

$\gamma$=arcsin H/R (maximum aperture angle) (see FIG. 3)

$s_0 = R - H/\tan\gamma + H/\tan 2\gamma$ (see FIG. 3)

$$dz_i = R - \sqrt{R^2 - H_i^2}$$ (Deviation in depths)

(see FIG. 3)

$h_0 = s_0 \times \tan z/2$ z = the angle between the beams 18 and 19, 19 and 20 and also 18' and 19' in accordance with FIG. 4.

Thus, for each height $H_i$ measured in the longitudinal direction of the originally spherical strip-like concave mirror 10, there results an angle of rotation $\Delta\alpha_i$ at which the corresponding surface element is twisted in such a way that it always stands at the same angle to the beam axis and thus the reflected beam is reflected at the same angle independently of the height $H_i$. Accordingly, the torsional value is superimposed in accordance with the invention on the spherical shape of the strip-like concave mirror 10 which almost fully compensates the straight running error shown in FIGS. 2 and 4 over the scanning length.

We claim:

1. Apparatus for generating a light curtain comprising an image forming strip-like concave mirror having a spherical shape and a light deflecting means, arranged in the vicinity of the focal point of the concave mirror, for periodically sweeping a bundled light beam coming from a radiation source over the concave mirror extending in a scanning direction and for receiving a light beam from the concave mirror and directing it to a photoelectric converter, wherein the radiation source, the photoelectric converter and the light deflecting means lie in a plane different from that of the concave mirror characterized in that the concave mirror is twisted in accordance with a defined function relative to an axis (S) which extends substantially in the longitudinal direction of the strip-like concave mirror in such a way that each surface portion of the concave mirror illuminated by the light beam during a complete sweep stands at least substantially at the same angle to a beam axis in a plane perpendicular to the scanning direction.

2. Apparatus in accordance with claim 1, characterized in that each half of the concave mirror extending in the longitudinal direction is in each case twisted along a helical line.

3. Apparatus in accordance with claim 1 comprising a mirror wheel (12) as the light deflecting means, characterized in that the twisting of the originally spherical, strip-like, concave mirror (10) is so matched to the size and position of the mirror wheel (12) that the straight running error which arises is largely compensated.

4. Apparatus for generating a light curtain comprising:
  an image forming spherical, strip-like concave mirror defining a focal point and having a superimposed twisted spherical shape and extending so as to define a scanning direction;
  a radiation source for generating a bundled light beam;
  a light deflecting means, disposed in the vicinity of the focal point, for periodically sweeping the beam in the scanning direction over said mirror;
  said mirror twisted in such a way that each surface portion of said mirror illuminated by said beam during a complete sweep stands at least substantially at the same angle to a beam axis so that the beam is reflected at a substantially constant angle.

5. The apparatus of claim 4, further comprising a photoelectric receiver wherein said deflecting means receives a light beam from said mirror and directs it to said photoelectric receiver.

6. The apparatus of claim 4, wherein said radiation source and said deflecting means lie in a plane different form that of said mirror.

7. The apparatus of claim 6, wherein said deflecting means comprises a mirror wheel having an axis of rotation tilted relative to a straight line perpendicular to the scanning direction.

8. Apparatus for generating a light curtain comprising:
  an image forming spherical, strip-like concave mirror defining a focal point;
  a radiation source for generating a light beam;
  a photoelectric receiver;
  a light deflecting means, disposed in the vicinity of the focal point, for periodically sweeping the light beam over said mirror and for receiving the light beam from said mirror and directing it to said photoelectric receiver;
  said mirror having a superimposed twist such that each surface portion of said mirror illuminated by the light beam stands at least substantially at the same angle to a light beam axis so that the beam is reflected at a substantially constant angle.

* * * * *